(12) United States Patent
Shagam et al.

(10) Patent No.: US 7,715,635 B1
(45) Date of Patent: May 11, 2010

(54) IDENTIFYING SIMILARLY FORMED PARAGRAPHS IN SCANNED IMAGES

(75) Inventors: Joshua Shagam, Seattle, WA (US); Robert L Goodwin, Mercer Island, WA (US); John C Burns, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 754 days.

(21) Appl. No.: 11/540,852

(22) Filed: Sep. 28, 2006

(51) Int. Cl.
*G06K 9/62* (2006.01)
(52) U.S. Cl. .................... 382/225; 715/201; 715/234; 715/235; 715/243
(58) Field of Classification Search ............... 382/224, 382/225; 715/201, 234, 235, 243
See application file for complete search history.

(56) References Cited

U.S. PATENT DOCUMENTS

| | | | |
|---|---|---|---|
| 4,741,045 A | | 4/1988 | Denning |
| 5,029,107 A | | 7/1991 | Lee |
| 5,285,526 A | | 2/1994 | Bennett et al. |
| 5,671,438 A | * | 9/1997 | Capps et al. ............... 715/234 |
| 5,774,580 A | | 6/1998 | Saitoh |
| 5,784,487 A | | 7/1998 | Cooperman |
| 5,850,490 A | | 12/1998 | Johnson |
| 5,860,074 A | | 1/1999 | Rowe et al. |
| 5,907,631 A | | 5/1999 | Saitoh |
| 5,978,819 A | | 11/1999 | Berstis |
| 6,002,798 A | | 12/1999 | Palmer et al. |
| 6,032,163 A | * | 2/2000 | Tou et al. .................... 715/235 |
| 6,256,610 B1 | | 7/2001 | Baum |
| 6,377,704 B1 | | 4/2002 | Cooperman |
| 6,766,495 B1 | * | 7/2004 | Bates et al. ................. 715/201 |
| 7,213,035 B2 | | 5/2007 | Ornstein et al. |
| 7,272,258 B2 | | 9/2007 | Berkner et al. |
| 7,362,311 B2 | | 4/2008 | Filner et al. |
| 7,392,472 B2 | * | 6/2008 | Simard et al. ............... 715/243 |
| 7,412,647 B2 | | 8/2008 | Sellers et al. |
| 7,433,548 B2 | | 10/2008 | Goodwin et al. |
| 7,469,388 B1 | | 12/2008 | Baudisch et al. |
| 7,486,628 B1 | | 2/2009 | Brisebois et al. |
| 2002/0052898 A1 | | 5/2002 | Schilit et al. |
| 2003/0014445 A1 | | 1/2003 | Formanek et al. |
| 2003/0126558 A1 | | 7/2003 | Griffin |
| 2003/0128234 A1 | | 7/2003 | Brown et al. |
| 2003/0135649 A1 | | 7/2003 | Buckley et al. |

(Continued)

OTHER PUBLICATIONS

Taghva et al., The Impact of Running Headers and Footers on Proximity Searching, Information Science Research Institute, University of Nevada, 2004, Las Vegas, Nevada, 5 pages.

(Continued)

*Primary Examiner*—Tom Y Lu
(74) *Attorney, Agent, or Firm*—Knobbe, Martens, Olson & Bear LLP

(57) ABSTRACT

A system and method for identifying and/or categorizing similarly formed paragraphs in a digital image is set forth. An exemplary system includes a processor and a memory. The memory stores executable components which when direct the system to perform the following: obtain at least one page image of reflowable textual content and identify at least one paragraph of textual content. Thereafter, for each identified paragraph, a plurality of paragraph metrics regarding the identified paragraph is determined. Based on the paragraph metrics, similarly formed paragraphs are clustered.

52 Claims, 8 Drawing Sheets

U.S. PATENT DOCUMENTS

| | | |
|---|---|---|
| 2004/0103371 A1 | 5/2004 | Chen et al. |
| 2004/0139384 A1 | 7/2004 | Lin |
| 2004/0146199 A1 | 7/2004 | Berkner et al. |
| 2005/0125549 A1 | 6/2005 | Katayama |
| 2005/0128516 A1 | 6/2005 | Tomita |
| 2005/0234893 A1 | 10/2005 | Hirsch |
| 2006/0005116 A1 | 1/2006 | Ferguson et al. |
| 2006/0282838 A1 | 12/2006 | Gupta et al. |
| 2007/0061704 A1 | 3/2007 | Simova et al. |
| 2007/0112810 A1 | 5/2007 | Jonsson |
| 2008/0267535 A1 | 10/2008 | Goodwin et al. |

OTHER PUBLICATIONS

Lin, X., Header and Footer Extraction by Page-Association, Hewlett-Packard Company, May 6, 2002, Palo Alto, California, U.S., pp. 1-8.

PDF Reference Fifth Edition, Adobe Portable Document Format Version 1.6, Chapter 5.9, Adobe Systems Incorporated, 1985-2004, pp. 440-446.

Montanes, E., et al., Towards Automatic and Optimal Filtering Levels for Feature Selection in Text Categorization, Advances in Intelligent Data Analysis VI, Sep. 2005, pp. 239-248.

* cited by examiner

IDENTIFYING SIMILARLY FORMED PARAGRAPHS IN SCANNED IMAGES

FIELD OF THE INVENTION

The present invention is directed to processing digital images of content and, more particularly, to identifying similarly formed paragraphs in digital images and associating similar paragraphs with a category.

BACKGROUND

As more and more users turn to computer networks such as the Internet and World Wide Web (hereinafter the "Web") for information, content providers are increasingly converting traditional content (e.g., printed materials such as books, magazines, newspapers, newsletters, manuals, guides, references, articles, reports, documents, and the like) to electronic form.

For some content providers, a quick and simple way to convert printed content to an electronic form for publication is to create a digital image of the printed content, i.e., a digital image containing representation of text. As those skilled in the art will appreciate, this type of conversion is typically performed through the use of a scanner. However, while simply generating a digital image (or images) of printed content can be accomplished quickly, the resulting digital images might not be particularly well suited for various scenarios. For example, digital images corresponding to the conversion of pages of a book into electronic form may not be well suited in some viewing scenarios. Of course, the reasons that a digital image is not always an optimal form/format of delivery are many, but include issues regarding the clarity or resolution of digital images, the large size of a digital image file and, perhaps most importantly, the rendering of the digital images on various sized displays. For example, traditional digital images may be of a fixed size and arrangement such that a computer user must frequently scroll his or her viewer to read the text. In other words, the text of a digital image can not be "reflowed" within the boundaries of the viewer. Generally described, "reflow" relates to the adjustment of line segmentation and arrangement for a set of segments. Digital content, such as digital text, that can be rearranged according to the constraints of a particular viewer, without the necessity of scaling, can "reflow" within the viewer, and is reflow content.

A novel approach to converting printed content into reflow digital content relates to processing content in a digital image into identifiable segments. An example of such an approach is set forth in co-pending and commonly assigned patent application entitled "Method and System for Converting a Digital Image Containing Text to a Token-Based File for High-Resolution Rendering," filed Mar. 28, 2006, U.S. patent application Ser. No. 11/392,213, which is incorporated herein by reference. As described in this reference, the content in a digital image is categorized into "glyphs," e.g., identifiable segments of content that can be scaled and/or reflowed within the boundaries of a viewer.

When presenting converted content that can be reflowed in a viewer according to viewer constraints, it is desirable to recognize the similarities in paragraph layout such that similarly formed paragraphs are reflowed in a similar manner. While a human can readily recognize patterns, context, and, therefore, similarities among the layout and flow of paragraphs on a printed page, determining the similarities via a computer is often problematic. Moreover, the level of difficulty increases when the paragraphs are organized into anything but the most simplest form. For example, recognizing similarly formed paragraphs organized in a multi-column format is extremely difficult. Nevertheless, as discussed above, recognizing similarly formed paragraphs is very desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A computing device for identifying and/or categorizing similarly formed paragraphs in a digital image is set forth. An exemplary computing device includes a processor and a memory. The memory stores executable components which, when executed, direct the system to perform the following: obtain at least one page image of reflowable textual content and identify at least one paragraph of textual content from the at least one page image. Thereafter, for each identified paragraph, a plurality of paragraph metrics regarding the identified paragraph is determined. Based on the paragraph metrics, a clustering analysis is performed resulting in at least one cluster of similarly formed paragraphs found.

A computer-implemented method for categorizing similarly formed paragraphs in at least one page image having reflowable textual content is also presented. The method includes the following steps as executed by a computer or computing device. At least one page image is obtained. From each page image, a plurality of paragraphs of reflowable textual content are identified. For each of the plurality of identified paragraphs, paragraph metrics are determined. The identified paragraphs are then clustered into one or more clusters of similarly formed paragraphs. A paragraph category is associated with each cluster of paragraphs. A paragraph style is generated for each paragraph category. Each paragraph style corresponds to at least some paragraph metrics of a typical paragraph of the corresponding categorized cluster.

A computer-readable medium bearing computer-executable instructions is further presented. In particular, when the instructions are executed by a computer, they configure the computer to perform in the following manner. Obtain at least one page image having a plurality of paragraphs of textual content therein. Identify a plurality of paragraphs of textual content. Thereafter, for each identified paragraph, determine a plurality of paragraph metrics. Based on the paragraph metrics, perform a clustering analysis of the identified paragraphs. The result of the clustering analysis yields at least one cluster of similarly formed paragraphs of the at least one page image. After the first clustering analysis is performed, repeatedly: standardize the paragraph metrics of each paragraph of each cluster to be consistent with the paragraphs within its cluster; and perform a subsequent clustering analysis of the identified paragraphs based on the standardized paragraph metrics thereby yielding a new clustering of paragraphs. This process is repeated until the number of clusters yielded by the subsequent clustering analysis is no longer reduced from the previous clustering analysis.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In order to better illustrate and describe a method and system for recognizing and categorizing similarly formed paragraphs in a page image, reference will be made to an exemplary page image of content as illustrated in FIGS. 1A-1D. More particularly, with reference to FIG. 1A, an exemplary page image 100 is shown. Actual characters of text are not displayed, but rather shaded rectangles are displayed representing textual content. Of course, shaded blocks more closely correspond to how the computer initially views a page image.

Figure 1A:
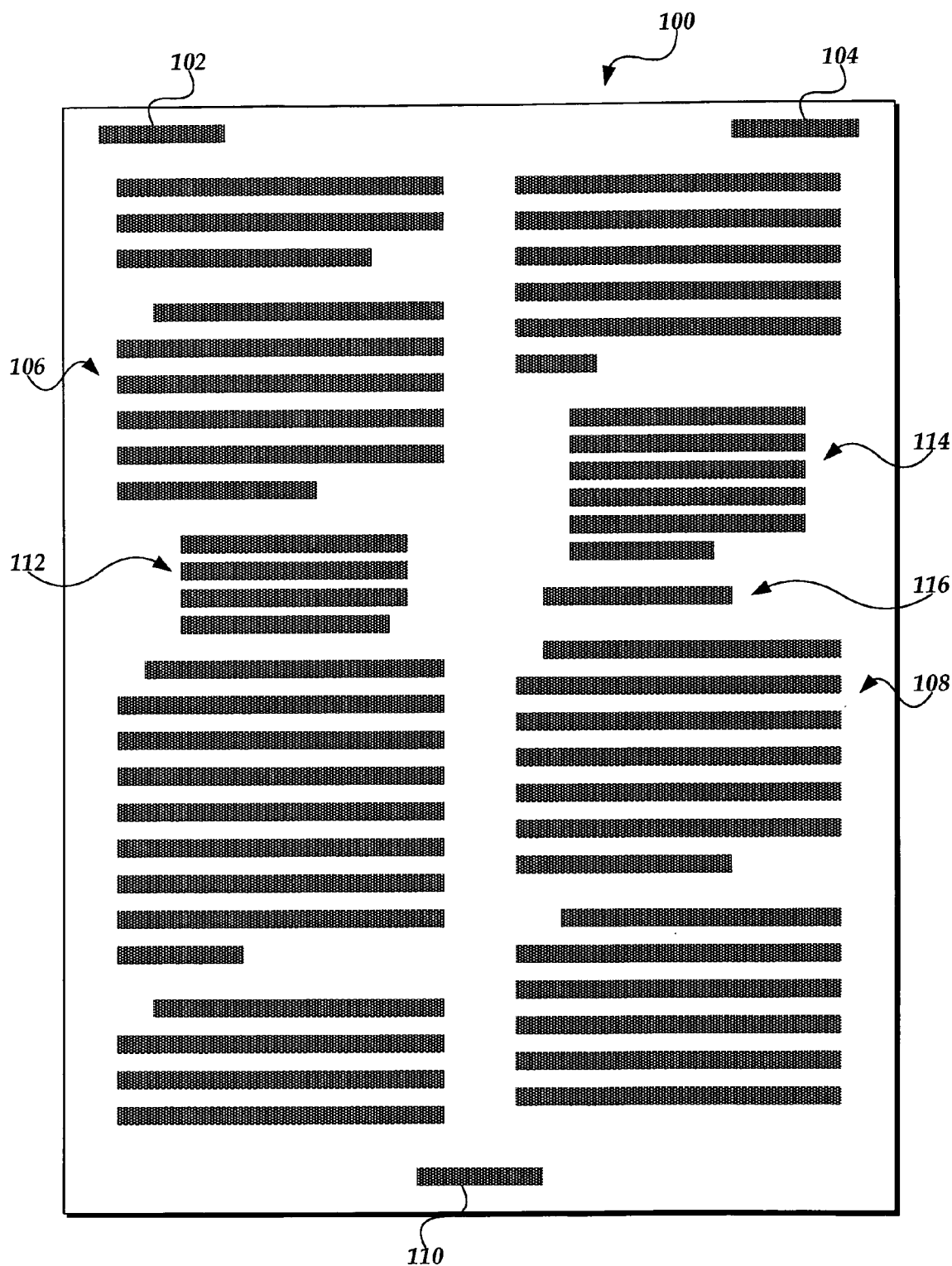
FIGS. 1A-1D are pictorial diagrams illustrating an exemplary page image having multiple columns of textual content, and used to illustrate aspects of the present invention.

The page image 100 of FIG. 1A includes various components readily recognized by a reader, even without representative text. More particularly, the exemplary page image 100 includes headers 102 and 104, which frequently correspond to content titles and chapter or section references; paragraphs, such as paragraphs 106 and 108, that are organized into two columns on the page; and a footer 110 which likely corresponds to a page number and/or a copyright notice. Moreover, while perhaps not as easily recognizable without the context provided by the text, the page image 100 also includes two block-quote paragraphs 112 and 114 and a single line paragraph 116.

Figure 2:
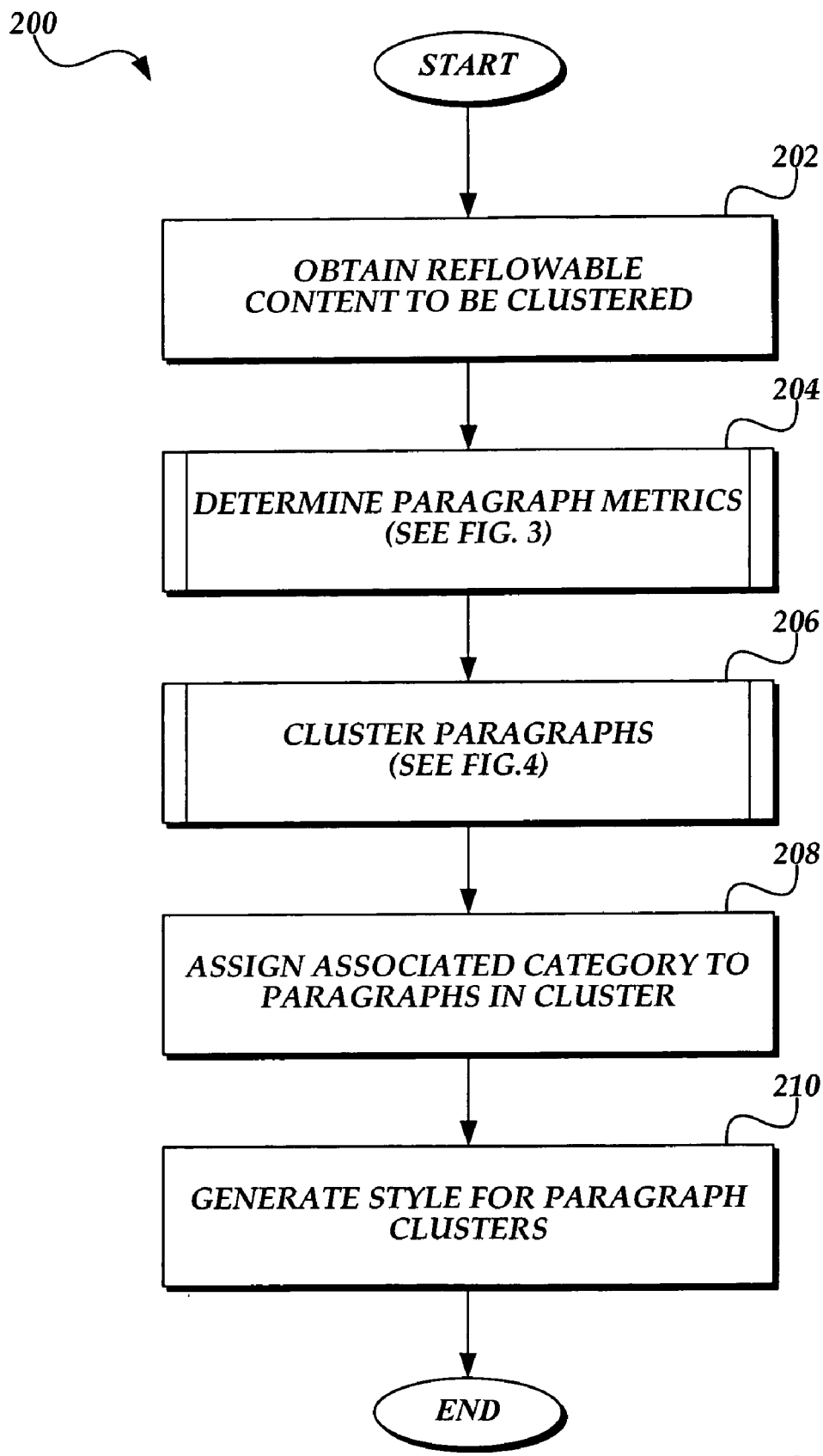
FIG. 2 is a flow diagram illustrating an exemplary routine for clustering and categorizing similarly formed paragraphs.

With regard to FIG. 2, this figure illustrates an exemplary routine 200 for clustering and categorizing similarly formed paragraphs. Beginning at block 202, the reflowable content to be clustered and categorized is obtained. With regard to the obtained reflowable content, it should be appreciated that the reflowable content may comprise an entire book of content (i.e., page images of an entire book), multiple volumes of content, one or more sections of a printed publication, an individual page, or any other collection of content deemed desirable to cluster and categorize. The purpose behind obtaining a particular amount of reflowable content is to cluster and categorize that content as a homogenous whole. Of course, those skilled in the art will appreciate that a representative segment of reflowable content could be utilized as a basis or template for categorizing other content, such as processing a first volume of a series of books, and using the information from clustering and categorizing the first volume as a template for clustering and categorizing other volumes. However, for the present discussion, content to be treated as a whole for clustering and categorization is described as being obtained en masse.

At block 204, the paragraphs in the obtained reflowable content are analyzed to determine paragraph metrics. Determining paragraph metrics for each paragraph in the obtained reflowable content is described in greater detail in regard to FIG. 3.

Figure 3:
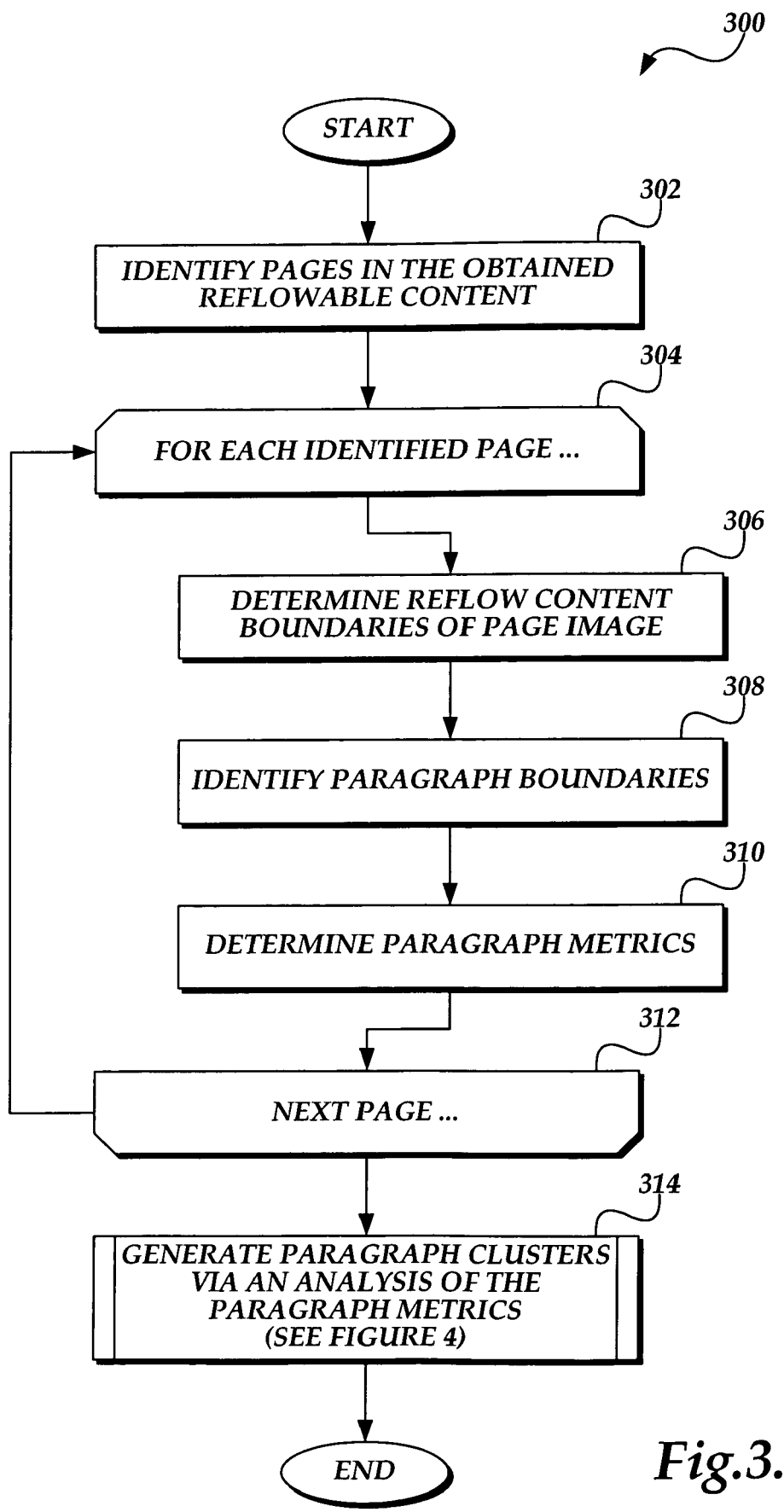
FIG. 3 is a flow diagram illustrating an exemplary routine for determining paragraph metrics for each paragraph in the obtained reflowable content, and suitable for use by the exemplary routine of FIG. 2.

With regard to FIG. 3, this figure illustrates an exemplary routine 300 determining paragraph metrics in the obtained reflowable content, and suitable for use by the exemplary routine of FIG. 2. More particularly, beginning at block 302, the exemplary routine 300 identifies pages within the obtained reflowable content. Of course, it should be appreciated that in at least one embodiment, the obtained reflowable content may be already organized on page boundaries, i.e., the content is organized in page images. Thereafter, at control block 304, a looping process is begun to iterate through all of the identified pages in the obtained content, such that the paragraphs in each page can be analyzed to determine its paragraph metrics.

Figure 1B:
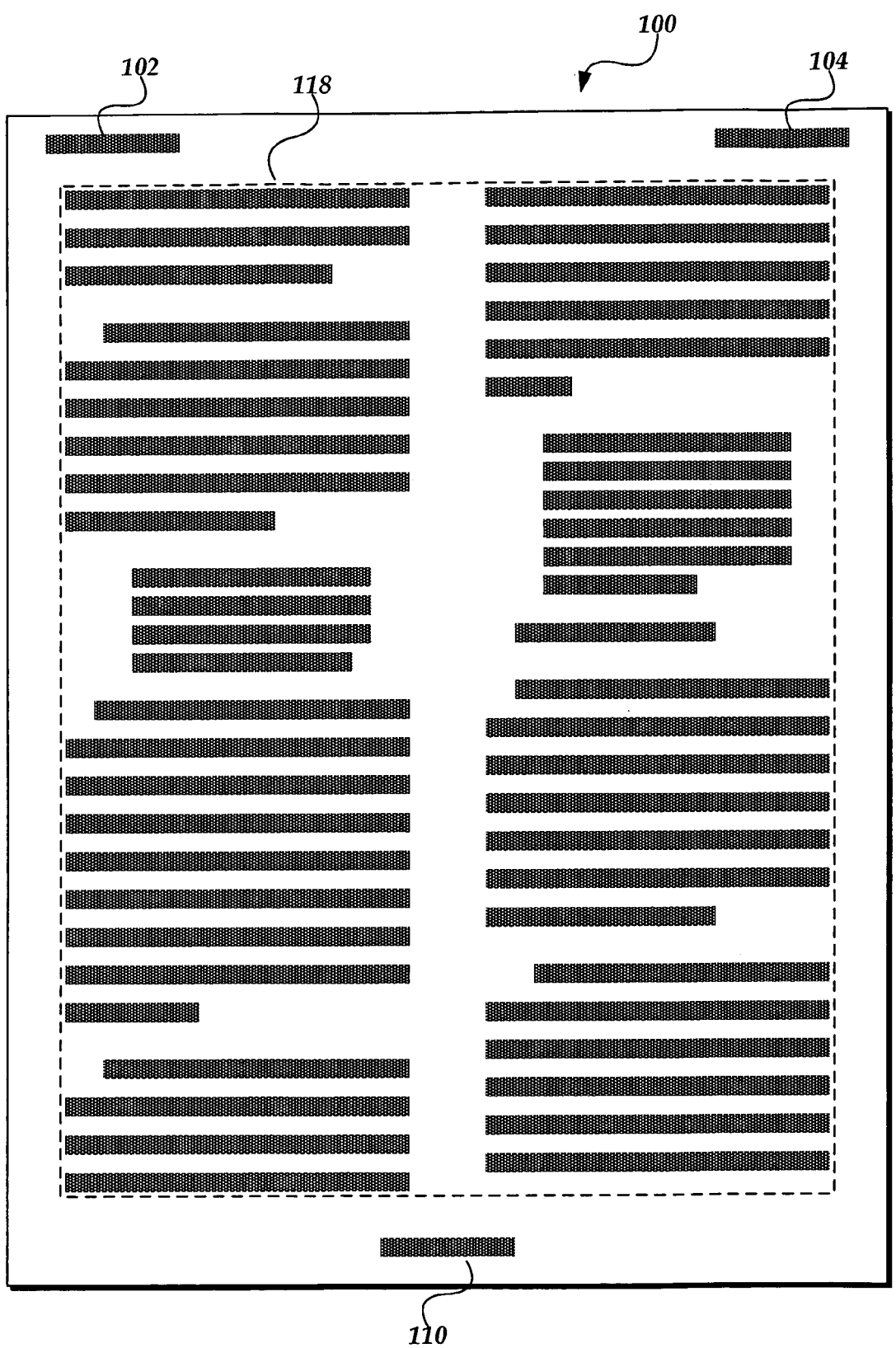

With reference to both FIG. 3 and FIG. 1B, at block 306 reflowable content boundaries, as illustrated by box 118, are determined for the current page 100. With regard to the reflowable content boundaries 118, those skilled in the art will appreciate that some page content, such as headers 102-104 and footers 110, while ubiquitously textual in nature, are not considered as part of the reflowable content since inclusion of them in the body or flow of content (i.e., the reflowable content) on a page would simply corrupt that content. While there may be various ways in which a header and/or footer is recognized for exclusion, a novel and useful means for recognizing whether textual content in a page image 100 is or is not a header or footer, such that it can be excluded from the reflowable boundaries 118 of the page, is set forth in detail in commonly assigned and co-pending U.S. patent application Ser. No. 11/392,999, entitled *"Processing Digital Images Including Headers and Footers into Reflow Content."*

With regard to the reflowable content boundaries 118, in one embodiment, the boundaries are aligned flush against the furthest reaches of the reflowable content on the left, right, top and bottom of the page 100. However, while placing the content boundaries 118 flush against the furthest reaches of the reflowable content may be advantageous, and implemented in at least one embodiment, it should be appreciated that flush alignment of the boundaries is not necessary for successfully clustering similarly formed paragraphs located on a page image 100. What is important is that the content boundaries exclude non-reflowable content. For clarity in the illustration of FIG. 1B, there is a slight gap shown between the furthest reaches of the reflowable content of the page 100 on the left, right, top, and bottom and the content boundaries illustrated by box 118. However, the following description will assume that this gap/distance is not present.

While not explicitly called out in FIG. 3, it should be noted that due to the nature of reflowable content, i.e., that most left margins are aligned vertically and that lines of text are aligned perpendicularly to the vertically aligned left margin, page deskewing and other image corrections may be made on the page image 100 using the identified content boundaries.

Figure 1C:
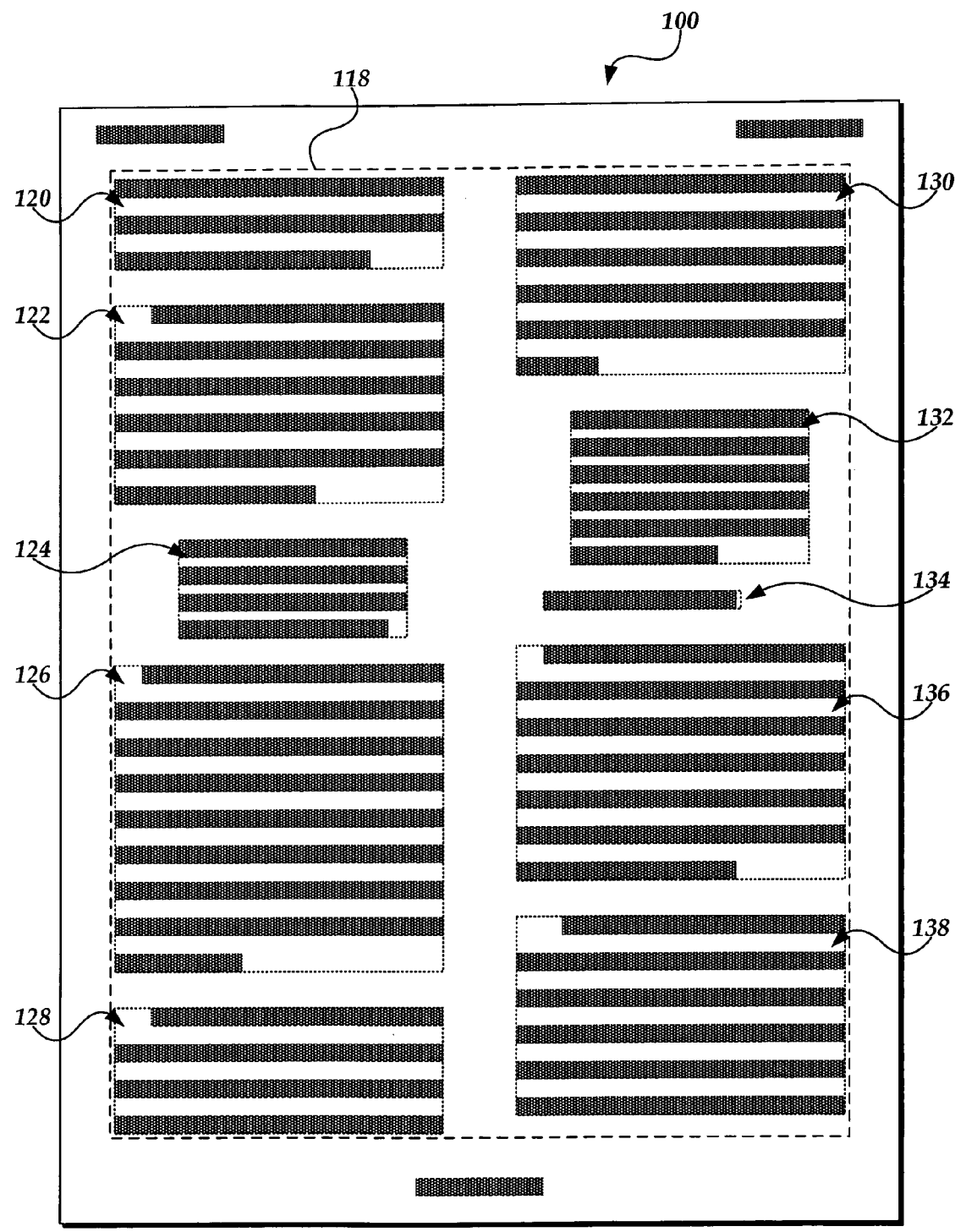

Once the content boundaries 118 for the page image 100 are determined, at block 308 the exemplary routine 300 identifies individual bounding regions for each paragraph within the page content boundaries 118. FIG. 1C illustrates the bounding regions, regions 120-138, of the identified paragraph boundaries. Moreover, while most people would recognize that the "paragraphs" of text identified by bounding regions 128 and 130 are really the same paragraph broken up over two columns, in at least one embodiment of the present invention, they are viewed as separate paragraphs.

After identifying the bounding regions 120-138 for each paragraph within the page's content boundaries 118, at block 310 various aspects or metrics of each identified paragraph are determined. These aspects and/or metrics (generally referred to as simply "metrics") include, but are not limited to, the following: the distance up, meaning the distance from the top of the paragraph's bounding region to either the top of the page image's content boundary (if at the top of the page) or the bottom of the previous paragraph's bounding region; the distance down, meaning the distance from the bottom of the paragraph's bounding region to either the bottom of the page image's content boundary (if at the bottom of the page) or the top of the following paragraph's bounding region; the distance left, meaning the distance from the left of the paragraph's bounding region to either the left of the page image's content boundary (if at the left-most side of the page) or the right side of the bounding box of the closest paragraph to the left; the distance right, meaning the distance from the right of the paragraph's bounding region to either the right of the page image's content boundary (if at the right-most side of the page) or the left side of the bounding box of the closest paragraph to the right; the amount of a first line indention, either a positive or negative value; line height, i.e., distance between the baselines of two consecutive lines; line count; a nesting level in a hierarchically formed or organized document; and the width of the paragraph. The specific metrics may be stored in any suitable representation or manner that is convenient for further processing, such as points, picture elements, centimeters, ratios and/or relative values with regard to the image, and the like.

Figure 1D:
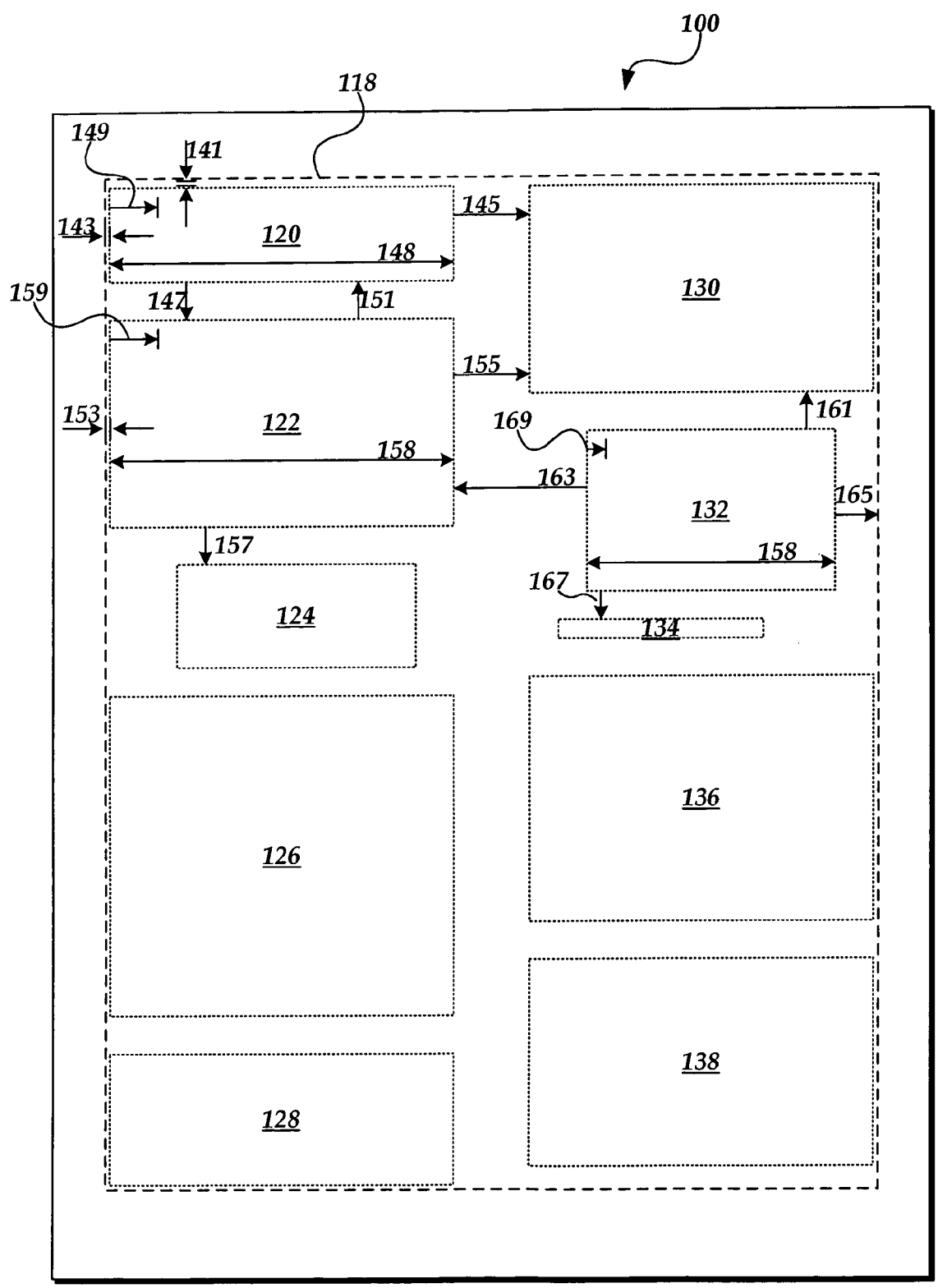

FIG. 1D illustrates the identified paragraph bounding regions of the paragraphs 120-138 illustrated in FIG. 1C without the shaded "text" areas, useful for illustrating various paragraph metrics. For ease of this discussion, the bounding regions of the paragraphs will be referred to as paragraphs themselves.

In regard to paragraph 120, its distance up is zero because this bounding region abuts the page image's content boundary 118, as indicated by arrows 141. Distance down, as illustrated by arrow 147, is determined as the distance between the bounding region of paragraph 120 and the next paragraph or the page's content boundaries 118, whichever is closer. In this case, the distance down, for example ten, is the distance from the paragraph's bounding region to paragraph 122. The distance left for paragraph 120 is zero since the paragraph's bounding region abuts the page image's content boundary 118 to the left, as indicated by arrows 143. Paragraph 120 has an exemplary distance right of twenty, which is the distance from the bounding region of paragraph 120 to the closest paragraph 130 to the right (as indicated by arrow 143) and since paragraph 120 is not adjacent to the right side of the page boundary 118. Paragraph 120 also illustrates a paragraph width via arrow 148. Line count (three, per FIG. 1C) and line height are also determined, though not shown. Finally, paragraph 120 includes an exemplary indentation of 20, as indicated by arrow 149.

Paragraph 122 shares many similarities to paragraph 120, such as distance left (zero) per arrows 153, distance down (ten) per arrow 157, paragraph width per arrow 158, and indentation (ten) per arrow 159. While the distance right (twenty), as indicated by arrow 155, is the same as for paragraph 120, note should be taken that paragraph 130 was selected for the distance as it is the closer of paragraphs 130 and 132, and also of the right page boundary 118. Distance up (ten) mirrors the distance down of paragraph 120, as indicated by arrow 151. Line count (six) can be seen via FIG. 1C, and the line height is likely the same as paragraph 120.

With regard to paragraph 132, which appears to be an indented paragraph which is common to quoted material, its distance up (ten), as indicated by arrow 161, appears to be similar to other paragraphs. Distance down (ten), as indicated by arrow 167, is similar to other paragraphs. The first line indentation is smaller (five) than other paragraphs, as indicated by arrow 169, but such variations are or can be expected. Since this paragraph is indented on both sides, the distance right (ten), as indicated by arrow 165, is non-zero even though the rightmost page boundary 118 is closest to the right, and has a smaller paragraph width as indicated by arrow 168. Of additional interest is the fact that the distance left (thirty), as indicated by arrow 163, does not correspond to the distance right of paragraph 122. Paragraph 122 used the distance between it and paragraph 130 to measure the distance right, since paragraph 130 was closer than paragraph 132.

Of course, those skilled in the art will appreciate that the above values are presented merely as examples for understanding the determination of various paragraph metrics. Clearly, depending on the page image, the arrangement of paragraphs, and the value representations, these values will and should vary.

With reference again to FIG. 3, once the metrics of the current paragraph are determined, the exemplary routine 300 proceeds to end control block 312 where the iteration of paragraphs in the page image continues, by looping back to control block 304, if there are additional paragraphs to be analyzed to determine their paragraph metrics, or to exit the looping structure.

Once paragraph metrics have been determined for all pages, the routine 300 proceeds to block 314. At block 314, paragraph clusters are generated via an analysis of the paragraph metrics. Those skilled in the art will appreciate that there are a variety of methods and/or algorithms, both deterministically and statistically based, that can be utilized to perform an analysis of the paragraph metrics in order to generate paragraph clusters. Some of these methods/algorithms include a Kohonnen net, a K-means, a fuzzy C-means, and the like. However, one embodiment of an applied analysis is described below in regard to FIG. 4.

Figure 4:
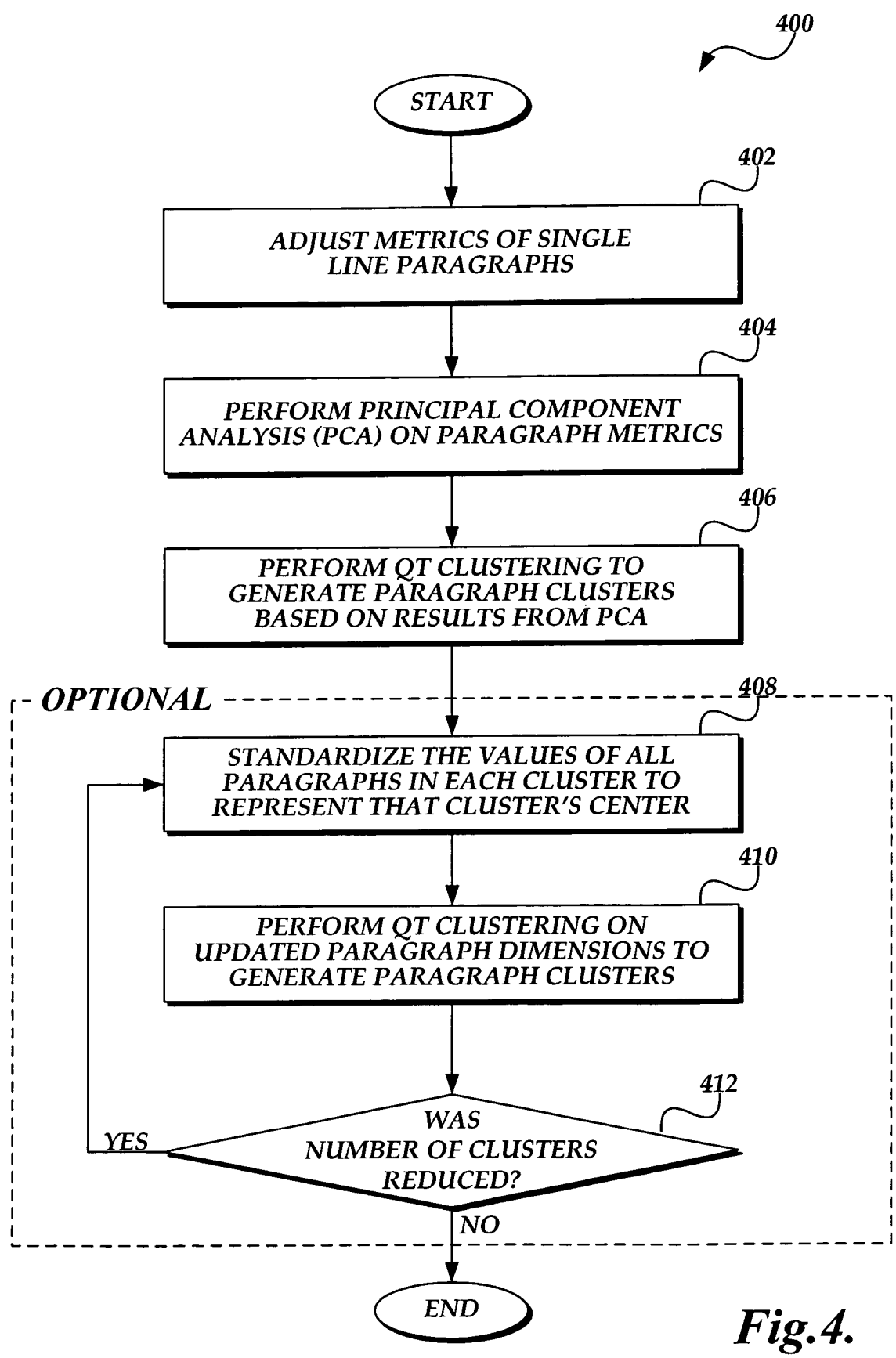
FIG. 4 is a flow diagram illustrating one exemplary routine for using a statistical analysis to cluster paragraphs from a page image, and suitable for use by the exemplary routine of FIG. 3.

With regard to FIG. 4, this figure illustrates an exemplary routine 400 for using statistical analysis to cluster similarly formed paragraphs from a page image according to at least one paragraph metric, and suitable for use by the exemplary routine 300 of FIG. 3. Beginning at block 402, single line paragraphs are, optionally, "adjusted" such that they have a text width of zero and a distance right of zero. In some circumstances, adjusting these metrics in this manner prevents single line paragraphs, such as paragraph 134 of FIG. 1D, from skewing the results or creating anomalous clusters. However, it should be appreciated that while measures may be taken to prevent single line paragraphs from skewing the results of a clustering algorithm, nevertheless, the one or more paragraph metrics of all single line paragraphs on a page are included in the clustering process and clustered in a resultant cluster.

At block 404, a principal component analysis (PCA) is performed on the one or more paragraph metrics. As those skilled in the art will appreciate, the PCA analyzes the paragraph metrics and, as a result, determines or orders combinations of metrics from most relevant to least relevant. In this embodiment, this PCA determination/combination of paragraph metrics is performed such that the clustering algorithm described hereafter relies more heavily on the most relevant combinations of data/metrics.

After the PCA has determined the most relevant combinations of paragraph metrics, at block 406 a Quality Threshold (QT) clustering algorithm is applied to at least some of the metric combinations, typically relying upon the most relevant combinations as determined by the PCA, but not necessarily using all paragraph metrics or combinations thereof to establish clusters. As those skilled in the art will appreciate, the results of the QT clustering is one or more clusters of paragraphs that are statistically similarly formed.

Clearly, at this point with the paragraphs clustered, the exemplary routine 400 could terminate and return the clusters as its results. However, in at least one embodiment, since most textual content has relatively few "types" of paragraphs, typically seven to twelve, and since paragraphs initially may be clustered into a substantially larger number of clusters that one would anticipate in a given page image, a series of optional steps may be taken to consolidate or reduce the number of paragraph clusters. Accordingly, at block 408, the metrics of each paragraph in a cluster is (at least temporarily) standardized such that it would suggest that the paragraph falls in the center (or median) of the cluster or within some deviation of center. For example, for each metric value of Paragraph A in Cluster A that was not the standard/average value of all paragraphs in Cluster A, that metric value would, at least temporarily, be modified to a standard/median value. In this manner, all paragraphs in a particular cluster are placed in the "center" of the cluster. Of course, in alternative embodiments, the values need not be adjusted to the exact center of the cluster, but could be adjusted such that they fall within a standard deviation of the median. Moreover, one of ordinary skill in the art will appreciate that there are numerous ways in which paragraphs in a cluster can be "standardized" such that additional clustering can be performed, all of which are contemplated as falling within the scope of the present invention.

At block 410, after the paragraphs in each cluster have been standardized to the center of the cluster, the QT clustering is again applied to the page image's paragraphs (with the updated/standardized values), thereby generating an updated set of paragraph clusters. Thereafter, at decision block 412, a determination is made as to whether the number of paragraph clusters was reduced from the previous QT clustering. This process repeats until the number of clusters is not reduced. Thus, at decision block 412, if the number was reduced, the routine 400 returns again to block 408 to once again "standardize" the paragraphs in each cluster to the center of their cluster, and then reapply the QT clustering process. Once the number of clusters is not reduced by further QT clustering, the routine 400 terminates.

With reference again to FIG. 3, after the paragraphs have been clustered together, indicating similarly formed paragraphs, the exemplary routine 300 terminates, and returns to routine 200.

With reference again to FIG. 2, after the paragraphs have been clustered, where each cluster represents similarly formed paragraphs, the routine 200 proceeds to block 206. At block 206, the various paragraph clusters are associated with a category. Moreover, at block 208, a style is generated for each cluster where each style is typical of the paragraphs of the cluster. Thereafter, the exemplary routine 200 terminates.

With regard to steps described in regard to FIG. 2, blocks 202 and 204 are typically implemented via a computer. However, blocks 206 and 208 may be implemented by computer, implemented by a human interacting with a computer to categorize the clusters and determine the representative characteristics of a cluster of paragraphs to generate the cluster style, or a combination of both computer processing and human interaction. For example, human interaction may be required when categorizing and stylizing the clusters especially when the number of clusters generated by the clustering analysis is greater than the number of paragraph types that would reasonably be found in a collection of paragraphs.

While various steps have been described with regard to FIG. 2, as well as all routines described herein, it should be appreciated that the exemplary routine may further include additional steps that, for the sake of clarity, are not described herein. For example, there may be additional steps take with regard to identifying a common layout style between multiple categories of paragraphs. Moreover, the various steps described should be viewed as logical steps, and may not correspond to discrete steps in an actual embodiment.

Additionally, with particular regard to the computer implemented processes/methods described above, it should be appreciated that they may be implemented on a variety of computing devices including, but not limited to, mini- and mainframe computers, workstations, desktop computers, notebook, laptop and tablet computers. Moreover, components of the present invention may be suitably distributed over a plurality of cooperating computers in a computer network.

Figure 5:
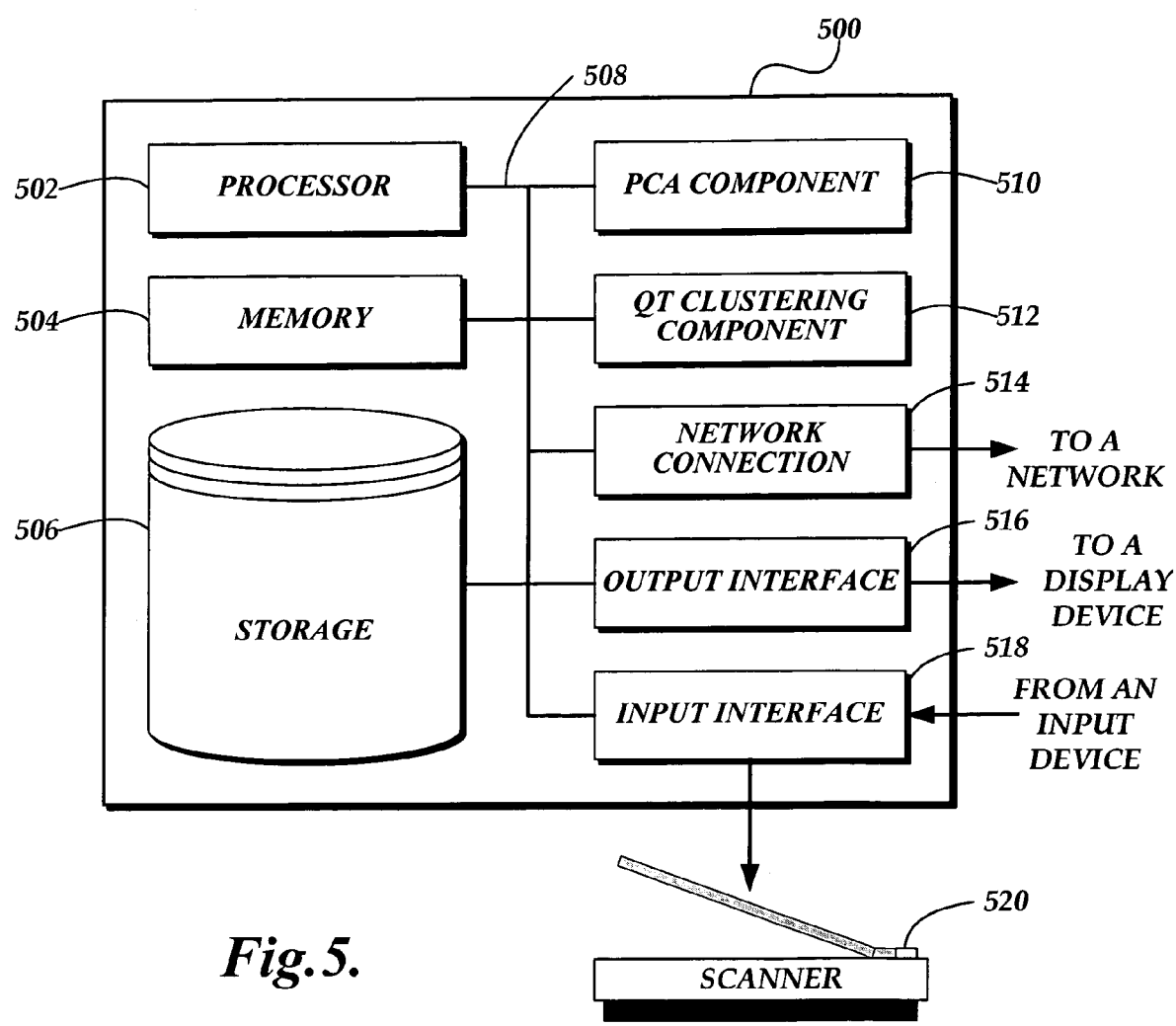
FIG. 5 is a block diagram illustrating components of an exemplary computing environment suitable for implementing aspects of the present invention.

While the present invention may be implemented on a variety of computing devices, FIG. 5 is a block diagram illustrating one exemplary embodiment of a computing device 500 suitable for implementing aspects of the present invention. In particular, the computing device 500 includes a processor 502, a memory 504, and a storage area 506 each interconnected via a system bus 508. When executing, the memory 504 of the computing device 500 typically stores all or portions of an operating system as well as one or more user applications, some of which may be used to implement the present invention. Similarly, the storage area 506, which may comprise any number and type of devices such as hard drives, non-volatile random-access memory (RAM), universal serial bus (USB) or thumb drives, removable computer-readable media drives, flash memory devices, and the like, stores the operating system for retrieval into memory 504 and execution by the processor 502. The storage area also typically stores one or more user applications and data, the user applications typically suitable for execution by the processor on the computing device. Data stored in the storage area 506 may include one or more page images for processing by the present invention.

Also shown in the exemplary computing device is a PCA component 510 used in at least one embodiment of the present invention to perform the PCA analysis to order the paragraph metrics according to their relevancy. The PCA component 510 should be a logical component comprising any number of cooperative actual components. Moreover, while the PCA component 510 is frequently implemented as a software component (and therefore likely stored in the storage area 506 and loaded into memory 504 for execution by the processor 502), it may alternatively be implemented in hardware, or a combination of hardware and software.

Similarly, the exemplary computing device includes a QT clustering component 512 for use in at least one embodiment of the present invention to cluster similarly formed paragraphs for, among other things, subsequent categorization. As with the PCA component 510, the QT clustering component 512 should be viewed as a logical component comprising any number of cooperative actual components, and may be implemented in software, hardware, or a combination of the two.

The network connection 514 provides network access to and from the computing device 500. In at least one embodiment, the computing device obtains page images for processing via the network connection 514, and/or returns the results of the categorization of similarly formed paragraphs to an external recipient. The network connection 514 may be a wired or wireless connection, both of which are well known to those skilled in the art. More particularly, according to at least one embodiment, the computer device obtains page images from an external source over a network via a wireless network connection.

The output interface 516 connects the computing device 500 to a display device for displaying information to a user. Similarly, the input interface 518 connects to one or more input devices through which the user is able to provide categorization information. Examples of input devices include, but are not limited to, keyboards, keypads, digitizing pens, mouse, microphone, and the like. Of course, in many instances the output interface 516 and the input interface 518 are combined into a single I/O interface. Accordingly, these should be viewed as logical, not necessarily actual, components. Still further, the input interface may interact with other devices, such as a removable media drive (not shown) or a digitizing device. An example of a digitizing device includes a scanner 520. Moreover, it should be further appreciated that page images may be obtained from a digitizing device and/or a computer-readable medium in the removable media drive. Still further, it should be understood that all or portions of the above processes to identify and categorize similarly formed paragraphs may be implemented in instructions stored on computer-readable media.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computing device for identifying similarly formed paragraphs according to an analysis of paragraph metrics, the computing device comprising:
   a processor; and
   a memory, the memory storing at least one component suitable for execution by the processor and which, when executed, directs the computing device to:
   obtain at least one page image, each page image comprising reflowable textual content;
   identify paragraphs of reflowable textual content in the obtained at least one page image;
   for each identified paragraph, determine a plurality of metrics regarding the identified paragraph; and
   perform a clustering analysis of the identified paragraphs based on at least one of the plurality of metrics of each paragraph, thereby resulting in at least one cluster of similarly formed paragraphs found on the at least one page image.

2. The computing device of claim 1, wherein performing the clustering analysis of the identified paragraphs based on at least one of the plurality of metrics of each paragraph comprises performing a quality threshold (QT) clustering analysis to generate at least one cluster of similarly formed paragraphs found in the at least one page image.

3. The computing device of claim 2, wherein performing the clustering analysis of the identified paragraphs based on at least one of the plurality of metrics of each paragraph further comprises combining at least two of the plurality of metrics and ordering a combination of metrics according to their relevancy of clustering paragraphs prior to performing said QT clustering analysis.

4. The computing device of claim 3, wherein combining at least two of the plurality of metrics comprises combining at least two of the plurality of metrics using a principle component analysis (PCA) on the plurality of metrics.

5. The computing device of claim 4 further configured to repeatedly:
   update the metrics of each paragraph within a cluster to reflect a standard paragraph of the cluster; and
   perform a QT clustering analysis on the updated metrics of each updated paragraph;
   until the number of clusters generated by the QT clustering analysis is not reduced.

6. The computing device of claim 2, wherein the clustering analysis of the identified paragraphs based on at least one of the plurality of metrics of each paragraph comprises one of a statistical analysis or a deterministic analysis on the at least one of the plurality of metrics of each paragraph.

7. The computing device of claim 1 further configured to determine the content boundaries of the reflowable textual content for each page image of the at least one page image.

8. The computing device of claim 7, wherein determining the content boundaries of the reflowable textual content for each page image comprises determining content boundaries to exclude non-reflowable content found on each page image.

9. The computing device of claim 8, wherein determining metrics for each identified paragraph comprises determining a bounding region for each of the identified paragraphs.

10. The computing device of claim 9, wherein determining metrics for each identified paragraph further comprises, for each identified paragraph, determining the distances between the paragraph's bounding region and the closest adjacent paragraph or the distances between the paragraph's bounding region and a corresponding content boundary when the paragraph is immediately adjacent to a content boundary.

11. The computing device of claim 10, wherein determining metrics for each identified paragraph further comprises, for each identified paragraph, determining the distance of indentation of the first line of text in the identified paragraph.

12. The computing device of claim 11, wherein determining metrics for each identified paragraph further comprises, for each identified paragraph, determining the line height of the paragraph, the line height being the distance between the baselines of two consecutive lines of textual content.

13. The computing device of claim 12, wherein determining metrics for each identified paragraph further comprises, for each identified paragraph, determining the level of hierarchical nesting of the textual content.

14. The computing device of claim 13, wherein determining metrics for each identified paragraph further comprises, for each identified paragraph, determining the width of the paragraph's bounding region.

15. The computing device of claim 14, wherein determining metrics for each identified paragraph further comprises, for each identified paragraph, determining whether the paragraph includes only a single line, and setting the paragraph width and distance to the right to zero if there is only one line.

16. The computing device of claim 1 further comprising a local storage area, and wherein obtaining the at least one page image comprises obtaining the at least one page image from the local storage area.

17. The computing device of claim 1 further comprising an input interface connected to a digitizing device, and wherein obtaining the at least one page image comprises obtaining the at least one page image from the digitizing device via the input interface.

18. The computing device of claim 1 further comprising a network interface connected to a network, and wherein obtaining the at least one page image comprises obtaining the at least one page image from an external source on the network via the network interface.

19. The computing device of claim 18, wherein the network interface is a wireless network interface that wirelessly connects the computing device to a network, wherein obtaining the at least one page image comprises obtaining the at least one page image from an external source on the network via the wireless network interface.

20. The computing device of claim 1, wherein the computing device is further directed to:
   associate a paragraph category with each cluster resulting from the clustering analysis; and
   generate a paragraph style for each paragraph category, wherein each paragraph style corresponds to at least some paragraph metrics of a typical paragraph of the categorized cluster.

21. The computing device of claim 20, wherein the computing device is further directed to determine whether the number of clusters resulting from the clustering analysis exceeds a predetermined threshold, and if so, obtaining human input regarding associating a paragraph category with each cluster.

22. A computer-implemented method for categorizing similarly formed paragraphs in at least one page image of reflowable textual content, the method comprising:
   obtaining at least one page image;
   identifying a plurality of paragraphs of reflowable textual content in each page of the at least one page image;
   determining a plurality of paragraph metrics regarding each of the plurality of identified paragraphs;
   clustering the identified paragraphs into at least one cluster of paragraphs according to at least some of the paragraph metrics;
   associating a paragraph category with each cluster of paragraphs; and
   generating a paragraph style for each paragraph category, wherein each paragraph style corresponds to at least some paragraph metrics of a typical paragraph of the corresponding categorized cluster.

23. The method of claim 22 further comprising determining whether the number of clusters exceeds an expected threshold, and if so, obtaining human input regarding associating a paragraph category with each cluster.

24. The method of claim 22, wherein clustering the identified paragraphs into at least one cluster of paragraphs according to at least some of the paragraph metrics comprises performing a clustering analysis of at least some of the paragraph metrics, the result yielding a clustering of the identified paragraphs.

25. The method of claim 24, wherein the clustering analysis of the paragraphs metrics comprises a quality threshold (QT) clustering analysis.

26. The method of claim 24 further comprising combining at least two paragraph metrics and ordering the combined paragraph metrics according to those combinations that are most relevant for clustering the paragraphs, and performing a clustering analysis of the ordered paragraph metric combinations.

27. The method of claim 26, wherein combining at least two paragraph metrics comprises performing a principle component analysis (PCA) on the paragraph metrics.

28. The method of claim 26, wherein determining a plurality of paragraph metrics regarding each of the identified paragraphs comprises determining content boundaries for the reflowable content of the corresponding page image.

29. The method of claim 28, wherein determining content boundaries for the reflowable content of the corresponding page image comprises excluding non-reflowable content on the corresponding page image.

30. The method of claim 28, wherein determining a plurality of paragraph metrics regarding each of the identified paragraphs further comprises determining a bounding region for each of the identified paragraphs.

31. The method of claim 30, wherein determining a plurality of paragraph metrics regarding each of the identified paragraphs further comprises, for each identified paragraph, determining distances of the paragraph to adjacent paragraphs or to the content boundaries of the corresponding page image when the paragraph is immediately adjacent to a content boundary, wherein the distances include at least one of a distance up, a distance left, a distance right, and a distance down.

32. The method of claim 31, wherein determining a plurality of paragraph metrics regarding each of the identified paragraphs further comprises, for each identified paragraph, determining the amount of indentation for the first line of text in each identified paragraph.

33. The method of claim 32, wherein determining a plurality of paragraph metrics regarding each of the identified paragraphs further comprises, for each identified paragraph, determining the line height of the paragraph, the line height being the distance between the baselines of two consecutive lines of textual content in the paragraph.

34. The method of claim 33, wherein determining a plurality of paragraph metrics regarding each of the identified paragraphs further comprises, for each identified paragraph, determining a level of nesting of the textual content with regard to a hierarchical document structure.

35. The method of claim 33, wherein determining a plurality of paragraph metrics regarding each of the identified paragraphs further comprises, for each identified paragraph, determining the width of the paragraph's bounding region.

36. The method of claim 35, wherein determining a plurality of paragraph metrics regarding each of the identified paragraphs further comprises, for each identified paragraph, determining whether the paragraph includes only a single line of textual content, and setting the paragraph width and distance right metrics to zero if there is only a single line of textual content in the paragraph.

37. The method of claim 24 further comprising:
   repeatedly:
      updating the metrics of each paragraph within each of the at least one clusters of paragraphs to reflect a standard paragraph of the cluster; and
      performing a clustering analysis of the updated paragraph metrics, the result yielding another clustering of the identified paragraphs;
   until the number of clusters generated by the clustering analysis is not reduced.

38. A computer-readable medium bearing computer-executable instructions which, when executed by a computer, configure the computer to:
   obtain at least one page image having a plurality of paragraphs of textual content therein;
   identify a plurality of paragraphs of textual content from the at least one page image;
   for each identified paragraph, determine a plurality of paragraph metrics;
   perform a clustering analysis of the identified paragraphs based on the paragraph metrics, thereby yielding at least one cluster of similarly formed paragraphs of the at least one page image; and
   repeatedly:
      standardize the paragraph metrics of each paragraph of each cluster to be consistent with the paragraphs within its cluster; and perform a subsequent clustering analysis of the identified paragraphs based on the standardized paragraph metrics, the subsequent clustering analysis yielding a clustering of paragraphs;

until the number of clusters yielded by the subsequent clustering analysis is no longer reduced.

39. The computer-readable medium of claim 38, wherein the clustering analysis of identified paragraphs comprises one of a statistical analysis and a deterministic analysis.

40. The computer-readable medium of claim 38, wherein the clustering analysis comprises:

performing a principle component analysis (PCA) of the paragraph metrics to generate at least one combination of paragraph metrics for clustering the paragraphs; and performing a quality threshold (QT) clustering analysis based on the results of the PCA to yield at least one cluster of similarly formed paragraphs of the at least one page image.

41. The computer-readable medium of claim 38, wherein the computer is further configured to:

associate a paragraph category with each cluster of paragraphs; and generate a paragraph style for each paragraph category, wherein each paragraph style corresponds to at least some paragraph metrics of a typical paragraph of the corresponding categorized cluster.

42. The computer-readable medium of claim 41, wherein the computer is further configured to determine whether the number of clusters exceeds an expected threshold, and if so, obtain human input regarding associating a paragraph category with each cluster.

43. A computer-implemented method for identifying similarly formed paragraphs according to an analysis of paragraph metrics, the computer-implemented method comprising:

as implemented by one or more computing devices configured with specific executable instructions, obtaining at least one page image, each page image comprising reflowable textual content;

identifying paragraphs of reflowable textual content in the obtained at least one page image;

for each identified paragraph, determining a plurality of metrics regarding the identified paragraph; and performing a clustering analysis of the identified paragraphs based on at least one of the plurality of metrics of each paragraph, thereby resulting in at least one cluster of similarly formed paragraphs found on the at least one page image.

44. The computer-implemented method of claim 43, wherein determining metrics for each identified paragraph comprises determining a bounding region for each of the identified paragraphs.

45. The computer-implemented method of claim 43, wherein determining metrics for each identified paragraph comprises, for each identified paragraph, determining the distance of indentation of the first line of text in the identified paragraph.

46. The computer-implemented method of claim 43, wherein determining metrics for each identified paragraph comprises, for each identified paragraph, determining a line height of the paragraph, the line height being the distance between baselines of two consecutive lines of textual content.

47. The computer-implemented method of claim 43, wherein determining metrics for each identified paragraph comprises, for each identified paragraph, determining a level of hierarchical nesting of the textual content.

48. The computer-implemented method of claim 44, wherein determining metrics for each identified paragraph comprises, for each identified paragraph, determining a width of the paragraphts bounding region.

49. The computer-implemented method of claim 43, further comprising:

associating a paragraph category with each cluster resulting from the clustering analysis; and generating a paragraph style for each paragraph category, wherein each paragraph style corresponds to at least one paragraph metric of a typical paragraph of the categorized cluster.

50. A computer-readable storage medium bearing computer-executable instructions which, when executed by a computer, configure the computer to:

obtain at least one page image, each page image comprising reflowable textual content;

identify paragraphs of reflowable textual content in the obtained at least one page image;

for each identified paragraph, determine a plurality of metrics regarding the identified paragraph; and perform a clustering analysis of the identified paragraphs based on at least one of the plurality of metrics of each paragraph, thereby resulting in at least one cluster of similarly formed paragraphs found on the at least one page image.

51. The computer-readable storage medium of claim 50, wherein performing the clustering analysis comprises performing a quality threshold (QT) clustering analysis to generate at least one cluster of similarly formed paragraphs found on the at least one page image.

52. The computer-readable storage medium of claim 50, wherein the computer is further configured to:

associate a paragraph category with each cluster resulting from the clustering analysis; and generate a paragraph style for each paragraph category, wherein each paragraph style corresponds to at least one paragraph metric of a typical paragraph of the categorized cluster.

* * * * *